(12) United States Patent
Lubbers et al.

(10) Patent No.: US 9,645,767 B2
(45) Date of Patent: May 9, 2017

(54) AGGREGATING STORAGE ELEMENTS USING A VIRTUAL CONTROLLER

(75) Inventors: Clark Edward Lubbers, Colorado Springs, CO (US); Stephen J. Sicola, Monument, CO (US)

(73) Assignee: Seagate Technology LLC, Cupertino, CA (US)

( * ) Notice: Subject to any disclaimer, the term of this patent is extended or adjusted under 35 U.S.C. 154(b) by 678 days.

(21) Appl. No.: 11/771,411

(22) Filed: Jun. 29, 2007

(65) Prior Publication Data
US 2009/0007149 A1  Jan. 1, 2009

(51) Int. Cl.
*G06F 12/00* (2006.01)
*G06F 3/06* (2006.01)

(52) U.S. Cl.
CPC ............ *G06F 3/0665* (2013.01); *G06F 3/061* (2013.01); *G06F 3/0659* (2013.01); *G06F 3/0683* (2013.01)

(58) Field of Classification Search
CPC ...... G06F 3/061; G06F 3/0659; G06F 3/0683; G06F 3/0665
USPC ........................................................ 711/114
See application file for complete search history.

(56) References Cited

U.S. PATENT DOCUMENTS

| | | | |
|---|---|---|---|
| 5,897,661 A * | 4/1999 | Baranovsky | G06F 3/0608 707/999.202 |
| 6,453,354 B1 * | 9/2002 | Jiang et al. | 709/229 |
| 6,983,303 B2 | 1/2006 | Pellegrino et al. | |
| 6,996,741 B1 | 2/2006 | Pittelkow et al. | |
| 7,162,582 B2 * | 1/2007 | Horn et al. | 711/118 |
| 7,237,062 B2 * | 6/2007 | Lubbers | G06F 3/0619 711/114 |
| 7,441,097 B2 * | 10/2008 | Lubbers | G06F 17/30067 707/999.101 |
| 2003/0188045 A1 * | 10/2003 | Jacobson | G06F 3/0601 710/1 |
| 2005/0050273 A1 * | 3/2005 | Horn et al. | 711/114 |
| 2006/0206494 A1 * | 9/2006 | Ibrahim et al. | 707/10 |
| 2007/0157002 A1 * | 7/2007 | Zelikov et al. | 711/202 |

* cited by examiner

*Primary Examiner* — Kalpit Parikh
(74) *Attorney, Agent, or Firm* — Hall Estill Attorneys at Law (57) ABSTRACT

Apparatus and method for aggregating storage elements. In accordance with various embodiments, a virtual storage space is formed across a plurality of storage elements each comprising an array of data storage devices. A virtual controller comprises a first storage element aggregator (SEA) configured to issue a first command to a selected storage element in response to receipt by the first SEA of a first host command. The virtual controller further comprises a second SEA configured to concurrently issue a second command to the selected storage element in response to receipt by the second SEA of a second host command.

14 Claims, 6 Drawing Sheets

TOP LEVEL MAP (TLM) ENTRY FORMAT

| | |
|---|---|
| 0x000FFFFF | BLM INDEX |
| 0x01F00000 | WRAPPING GRID OFFSET |
| 0x7E000000 | WRAPPING GRID INDEX |
| 0x80000000 | SPARSE ALLOCATIONS FLAG |

TOP LEVEL MAP (TLM) ENTRY FORMAT

| 0x000FFFFF | BLM INDEX |
|---|---|
| 0x01F00000 | WRAPPING GRID OFFSET |
| 0x7E000000 | WRAPPING GRID INDEX |
| 0x80000000 | SPARSE ALLOCATIONS FLAG |

FIG. 10

WRAPPING GRID (FOR SE=9)

AGGREGATING STORAGE ELEMENTS USING A VIRTUAL CONTROLLER

BACKGROUND

Data storage devices are used in a variety of applications to store and retrieve user data. The data are often stored to internal storage media, such as one or more rotatable discs accessed by an array of data transducers that are moved to different radii of the media to carry out I/O operations with tracks defined thereon.

Storage devices can be grouped into storage arrays to provide consolidated physical memory storage spaces to support redundancy, scalability and enhanced data throughput rates. Such arrays are often accessed by controllers, which in turn can communicate with host devices over a fabric such as a local area network (LAN), the Internet, etc. A virtual storage space can be formed from a number of devices and controllers to present a single virtual logical unit number (LUN) to the network.

SUMMARY

Various embodiments of the present invention are generally directed to an apparatus and method for aggregating storage elements.

In accordance with various embodiments, a virtual storage space is formed across a plurality of storage elements each comprising an array of data storage devices. A virtual controller comprises a first storage element aggregator (SEA) configured to issue a first command to a selected storage element in response to receipt by the first SEA of a first host command. The virtual controller further comprises a second SEA configured to concurrently issue a second command to the selected storage element in response to receipt by the second SEA of a second host command.

DETAILED DESCRIPTION

Figure 1:
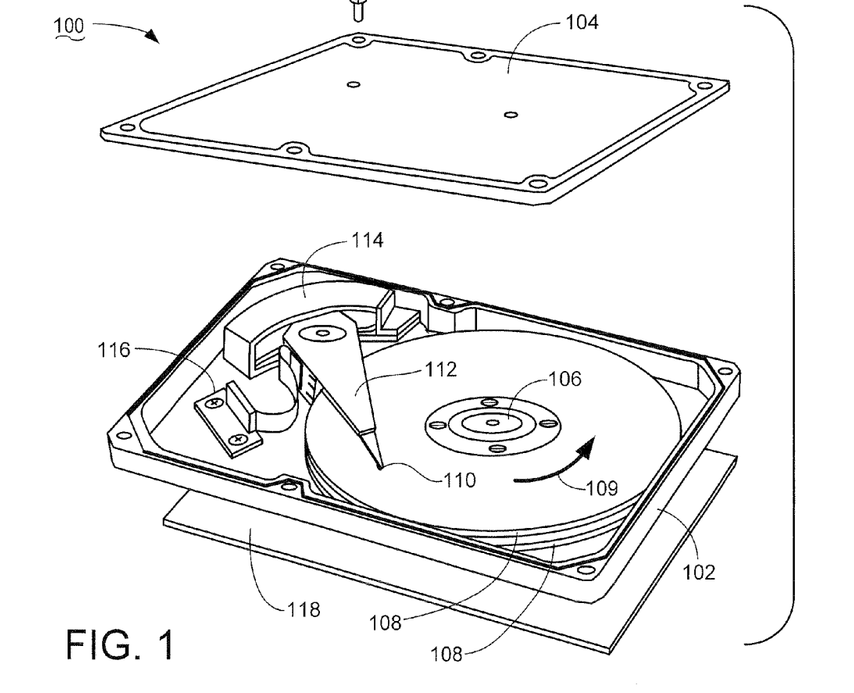
FIG. 1 shows an exemplary data storage device.

FIG. 1 shows an exemplary data storage device in accordance with various embodiments. The device is characterized as a hard disc drive (HDD) of the type configured to store and transfer user data with a host device, although such is not limiting.

The device 100 includes a housing formed from a base deck 102 and top cover 104. An internally disposed spindle motor 106 is configured to rotate a number of storage media 108 in rotational direction 109. The media 108 are accessed by a corresponding array of data transducers (heads) 110 disposed adjacent the media to form a head-disc interface (HDI).

A head-stack assembly ("HSA" or "actuator") is shown at 112. The actuator 112 rotates through application of current to a voice coil motor (VCM) 114. Controlled operation of the VCM 114 causes the transducers 110 to align with tracks (not shown) defined on the media surfaces to store data thereto or retrieve data therefrom. A flex circuit assembly 116 provides electrical communication paths between the actuator 112 and device control electronics on an externally disposed printed circuit board (PCB) 118.

Figure 2:
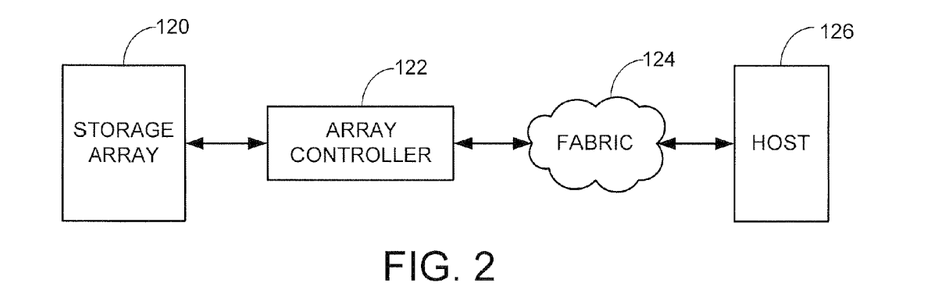
FIG. 2 sets forth a network system that incorporates the device of FIG. 1.

In some embodiments, the device 100 is incorporated into a multi-device data storage array made up of a plurality of such devices arranged into a larger memory space, such as in a selected RAID (redundant array of independent disks) configuration. An exemplary storage array is shown in FIG. 2 at 120.

The storage array 120 is controlled by an array controller 122, which is provisioned with one or more processing cores to manage complex data I/O transactions with the array. The controller 122 communicates across a computer network, or fabric 124 to any number of host devices, such as exemplary host device 126. The fabric can take any suitable form, including the Internet, a local area network (LAN), etc. The host device 126 can be an individual personal computer (PC), a remote file server, etc.

Figure 3:
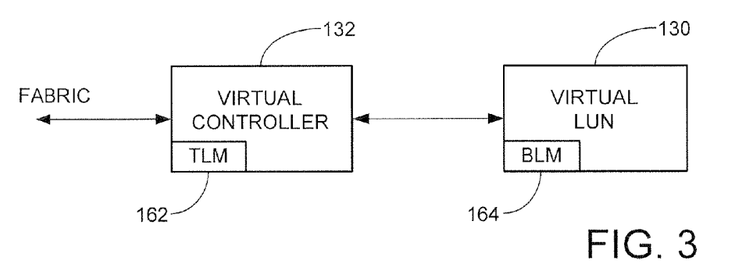
FIG. 3 generally illustrates a virtual logical unit number (LUN) storage space in conjunction with a virtual controller in accordance with various embodiments of the present invention.

FIG. 3 generally illustrates a virtual logical unit number (LUN) storage space 130 in conjunction with a virtual controller 132 in accordance with various embodiments of the present invention. Generally, the storage capacity of the LUN is virtualized across a number of network elements in order to scale system performance above the capabilities of a single controller while mitigating the effects of failures on individual controllers.

Figure 4:
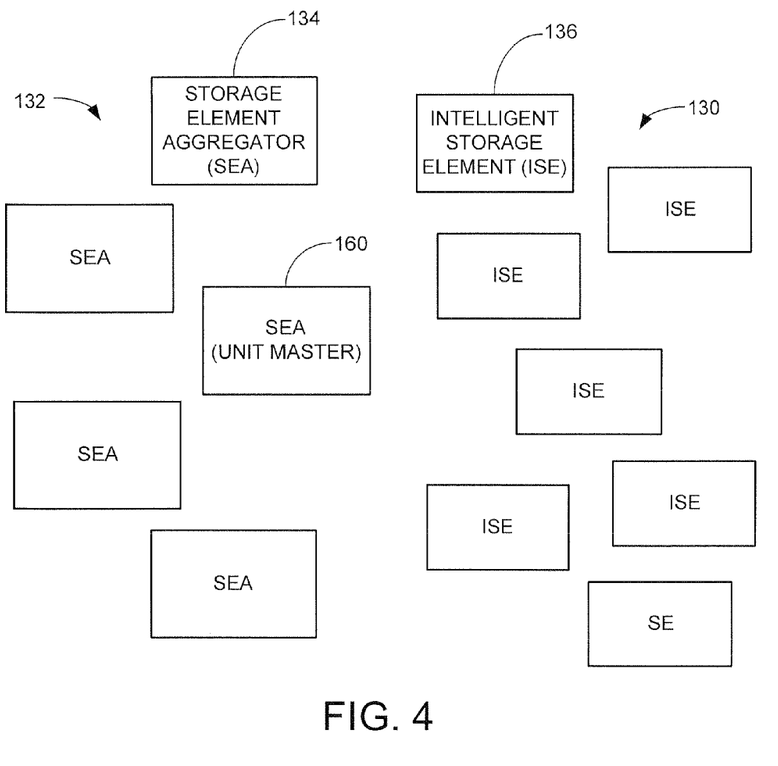
FIG. 4 generally depicts a physical memory space with a plurality of physical storage element aggregators (SEAs) in conjunction with a plurality of physical intelligent storage elements (ISEs) that can be selectively incorporated into the virtual elements of FIG. 3.

The virtual controller 132 of FIG. 3 is realized by a population of 2 to M storage element aggregators (SEAs) 134, as shown in FIG. 4. The virtual LUN 130 of FIG. 3 is correspondingly realized by a population of 2 to N storage elements, preferably characterized as intelligent storage elements (ISEs) 136.

Generally, each SEA 134 can be replicated many times to provide increasing levels of redundancy, performance, and connectivity for a particular configuration to manage and present the aggregate storage capacity of the corresponding pool of ISEs 136. The SEAs 134 are actively coupled in parallel to the ISEs 136, as well as to each other. The host ports of the SEAs 134 may be connected to a set of hosts either directly or via switches. The back end ports of the SEAs 134 are preferably coupled to the ISEs 136 via loop switch modules (LSMs), as discussed below.

Figure 5:
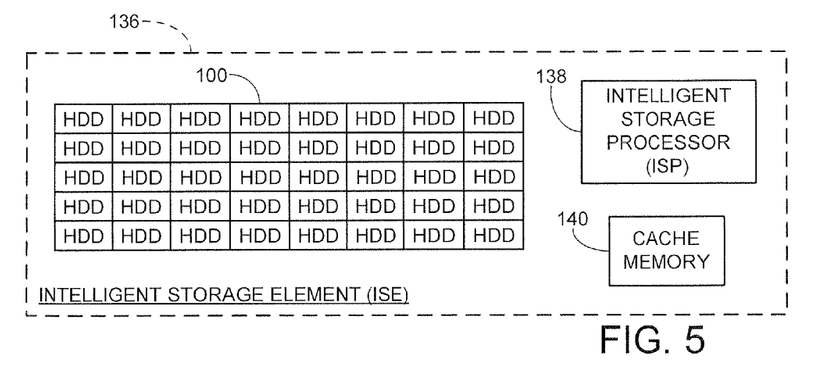
FIG. 5 is a schematic representation of a selected ISE from FIG. 4.

Each ISE 136 is an intelligent module made up of a number of data processing components, such as exemplified in FIG. 5. In FIG. 5, the exemplary ISE 136 includes a total number of 40 storage devices 100 (HDDs), at least one intelligent storage processor (ISP) 138 and a data cache memory 140. Generally, the ISP 138 operates as a controller to direct data I/O access commands and data to the arrayed devices 100.

Figure 6:
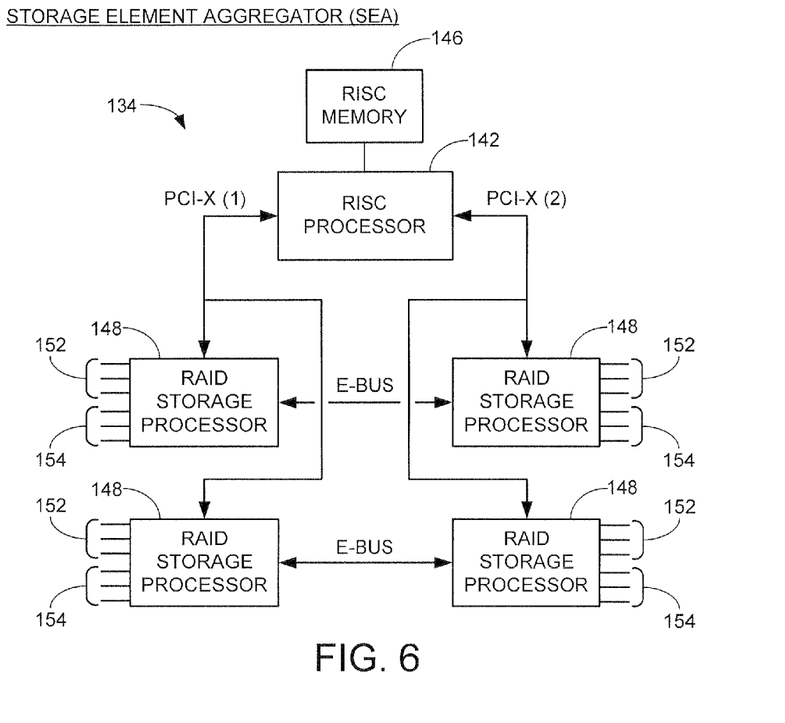
FIG. 6 provides a simplified functional representation of a selected SEA from FIG. 4.

An exemplary SEA format is set forth in FIG. 6. A RISC processor 142 (policy processor) provides top level control of the SEA 134. The RISC processor 142 is preferably characterized as a PowerPC® ASIC with two PCI-X busses (generally denoted at 144) and RISC memory 146. Four RAID storage processors 148 are coupled to the RISC processor 142, each preferably characterized as an Aristos Logic MPX ASIC with an associated memory system (not separately shown).

The processors 148 each operate as a plurality of function controllers (FCs) to carry out specific functions as directed by the policy processor 142, and are interconnected via a high-speed external bus (E-Bus) 150 to enable the processors 148 to be paired for dual operation.

The SEA 134 includes a plurality of host ports 152 that connect to host devices 126 (FIG. 2) via the fabric 124 (FIG. 2). A plurality of back end ports 154 are connected to loop switch modules (LSMs) 156 to the pool of ISEs 136.

Figure 7:
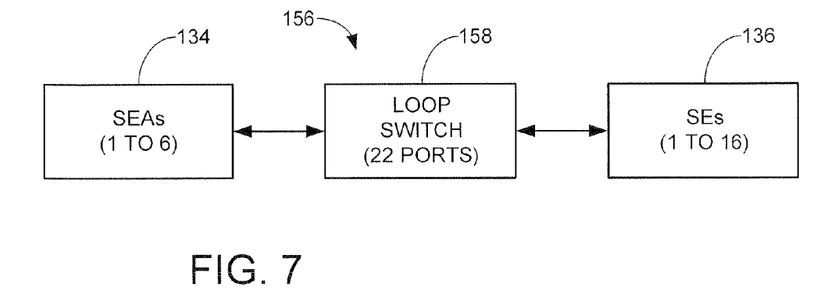
FIG. 7 shows an exemplary connection of a number of SEAs to a number of ISEs via a loop switch.

Each SEA 134 is a standalone unit and preferably has no redundancy by itself. Instead, each LSM 156 comprises a number of loop switches, such as six 22-port switches, one of which is denoted at 158 in FIG. 7. Each of these loop switches 158 preferably connects from 1 to 6 SEAs 134 and from 1-16 ISEs 136.

Figure 8:
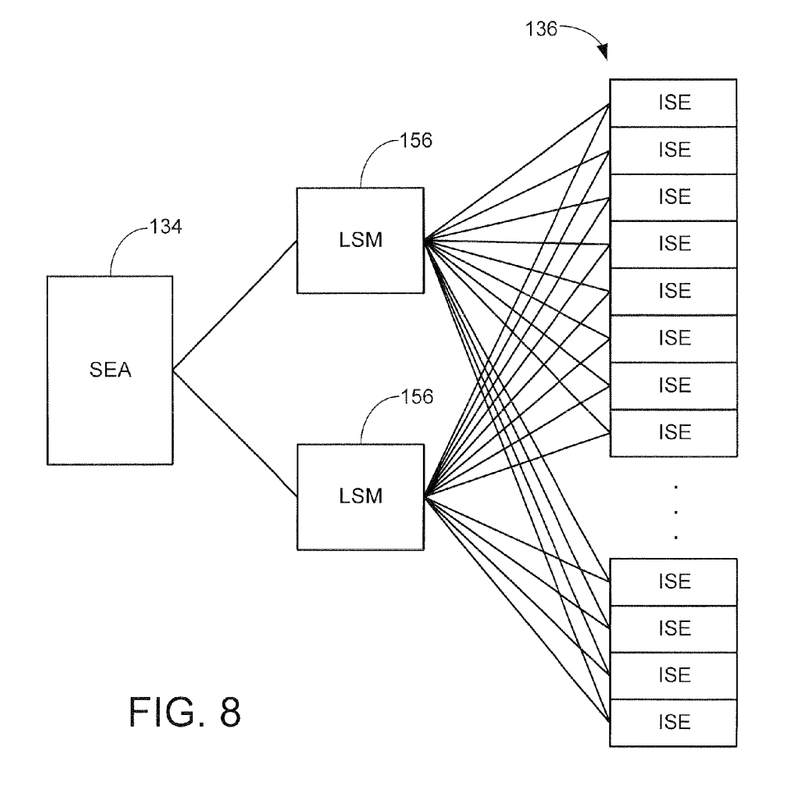
FIG. 8 shows a corresponding redundant connection of a selected SEA to a population of ISEs via a pair of loop switch modules.

In turn, every SEA 134 is preferably coupled to two LSMs 156, as shown in FIG. 8, with up to 6 ports connected on each LSM to other SEA modules to provide redundant connection of 1 to 96 ISEs. If 4 ports per ISE are used, then an LSM 156 can be configured with 3 22-port loop switches 158 for quadruple back end redundancy (that is, 4 LSMs 156 supporting a maximum of 48 ISEs 136).

The SEAs 134 preferably do not maintain a separate write back cache memory, but instead utilize the write back cache capabilities of the individual ISEs 136, as explained below. The storage processors 148 preferably execute script based operations that allow the policy processor 142 to issue a single request to perform a write through operation entirely within a selected storage processor 148. Sustained data rates of on the order of 500K (500,000) to 1M (1,000,000) IOPS (I/O operations per second) are contemplated for the architecture of FIGS. 6-8.

With 12 ports per SEA 134, each SEA could provide 9.6 GB/s ($9.6 \times 10^9$ bits/sec) of bandwidth for a single LUN. A particular SEA can be denoted as a "unit master," such as identified at 160 in FIG. 4, enabling the LUN to be presented on all hostports of all SEAs 134 within the pool. This would likely entail the use of two additional command and response exchanges per request to maintain cache coherency under a strict SCSI (small computer system interface) standard interface. Under a "loose SCSI" implementation, the extra exchanges would generally only be used for non-transfer commands. In this latter case, a single LUN could be provisioned with 57.6 GB/s of bandwidth (via 6 SEA modules).

In both cases, a single LUN could be scaled to cover up to 11,520 devices 100 (and a corresponding 3M IOPS rate).

With 6 SEA modules, a total of 72 (6*12) host ports would be available, and a relatively large, fully redundant storage area network (SAN) could be provided to accommodate 12 to 36 hosts, where every host could see every LUN.

Preferably, the SEAs 134 are not configured to map storage, but rather, to read maps maintained by the ISEs 136. The SEAs 134 thus work cooperatively with the ISEs 136 to present the accumulated storage space and allow write back caching, RAID processing and IOPS rates to scale proportionally with the number of devices 100 added to (or removed from) the virtual LUN space.

As desired, a particular host device (such as 126, FIG. 2) may be configured to recognize the virtual LUN as presented by all of the SEAs 134 as being the same LUN even though the world wide name (WWN) of each individual SEA 134 is different. Alternatively, a group of SEAs 134 will be bound together to present a common WWN node name and different port names for each associated port. This latter configuration allows the combined I/O capabilities of all of the respective devices 100 to support the capability of the LUN itself.

A "basic mode" of operation for the LUN is thus defined as an operation in which the SEAs 134 are bound to provide a virtual single array controller with many ports that present a single WWN node name, as generally depicted in FIG. 3. The basic mode passes all commands through the unit master 160 (FIG. 4) designated for a particular LUN in order to present a standard SCSI model transparently to each host; that is, all commands issued by hosts are passed through the unit master. Commands can be issued to any of the SEAs 134, but the receiving SEA gets permission from the unit master 160 before proceeding with the command.

In an "enhanced mode" of operation, a split SCSI model is preferably enacted in cooperation with all hosts to provide cached data and command gate keeping functions through the unit master. The enhanced mode involves all hosts knowing that a split LUN model with a unit master arrangement is being used, and coordination of commands is carried out via appropriate rules at the host level to ensure proper behavior (i.e., no conflicts). Enhanced mode operation significantly improves performance by allowing most requests to be processed by SEAs 134 other than the unit master without requiring the SEAs to check with the unit master, as in the basic mode.

A novel mapping scheme is utilized by the system of FIGS. 3-8, which facilitates system expansion and data migration. This mapping scheme preferably uses a number of data structures, including a top level map (TLM) 162 and a bottom level map (BLM) 164 (see FIG. 3). The TLM 162 can be maintained at the host 126 and/or SEA 134 level, whereas the BLM 164 is preferably maintained at the ISE 136 level.

The virtual storage space of the LUN is arranged as a plurality of larger grains of selected storage capacity, such as in the range of about 2 GB to 4 GB. Each of the larger grains can be moved independently within the LUN 130, which facilitates parallel migration of multiple larger grains as desired. Each of the larger grains is divided into a number of smaller grains, such as on the order of 8 MB ($8 \times 10^6$ bytes) or 16 MB. The number of smaller grains in each of the larger grains is preferably selected to be a power of 2 (e.g., 8, 16, 32, etc.). The TLM 162 generally describes the locations of the smaller grains as the larger grains are distributed (striped) across multiple ISEs 136, with a different ISE 136 storing a different smaller grain.

Figure 9:
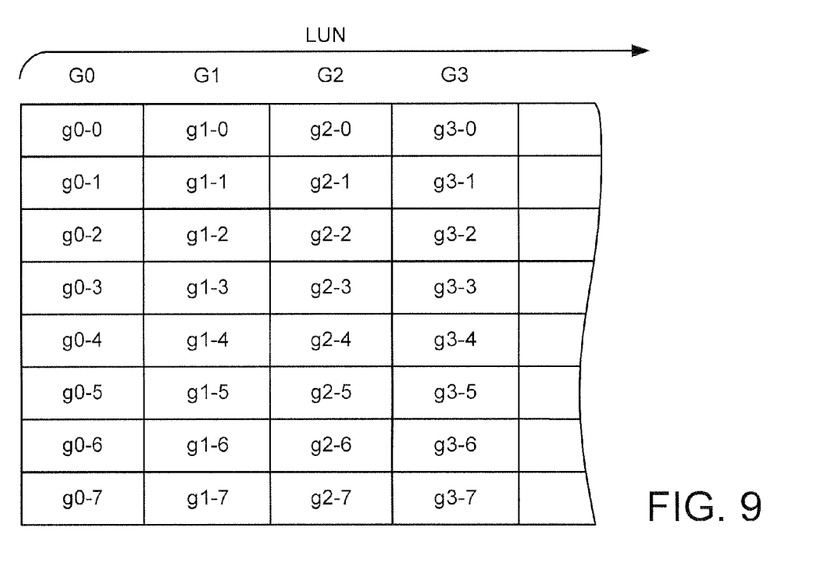
FIG. 9 sets forth a generalized depiction of a top level grouping of large grains and smaller grains of memory capacity that make up the virtual LUN of FIG. 3.

By way of illustration, FIG. 9 generally shows a number of larger grains that form a part of the LUN virtual space.

The larger grains are denoted in FIG. 9 as G0-G3. Each of the larger grains is further shown to be made up of eight (8) smaller grains. The smaller grains of larger grain G0 are denoted in FIG. 9 as g0-0 through g0-7.

Each of the smaller grains in the mapping scheme is managed by a separate ISE 136. Preferably, this smaller grain is in turn internally striped across multiple devices 100 and may be mirrored or otherwise redundantly stored therein. Each ISE 136 further has a map for the entire LUN by way of the TLM. As explained in greater detail below, each ISE 136 will preferably have a TLM that is identical except for the BLM index values in each entry. An index into the TLM is derived from the VBA (virtual block address) by dividing by the grain size of 2 GB or 4 GB in blocks.

A Member Position value is also derived from the VBA (in a manner explained below), with the Member Position being added to a Wrapping Grid Offset value in the TLM entry to index the particular array identified by a Wrapping Grid Index. The value returned is a SET value (Storage Element Tag). If the returned SET value matches the SET value of a particular ISE 136, then the VBA blocks reside on that ISE 136. Otherwise, the SET value indicates which ISE contains the VBA blocks. In this way, the BLM on each ISE 136 only maps the smaller grains present on that particular ISE.

In the aforementioned basic mode, all commands flow through the unit master, and the data and status for each command will be delivered by the associated ISE 136 via the SEA 134 to which the command was directed. The unit master preferably manages migration and updating of the maps, although migration of a specific set of grains from a given ISE 136 will be performed at the ISE level. Such migration generally involves moving sets of grains amounting to ⅛th of a BLM (corresponding to 1 TLM entry) on a particular storage element, one set at a time. The associated TLM entry will be updated on each ISE after the completion of the data movement.

Generally, the BLM 164 is arranged to incorporate multiple virtual spaces (at the smaller grain) into an ISE level data structure (such as 2 GB or 4 GB). A wrapping grid is formed from a cyclical wrapping grid function as a repeating pattern of storage element tag (SET) values. Every ISE 136 is assigned a unique SET value, and the wrapping grid can support up to a total of 32 ISEs 136 (e.g., SET values of 0 to 31). The SET values in each wrapping grid are preferably ordered and repeated enough times to fill a 64 byte array. For reference, a larger storage array virtualization environment (SAVE) can be provided to support up to 256 SEs 136 (and hence, up to 8 wrapping grids). In a preferred embodiment, the maximum SAVE has 96 ISEs 136.

Figure 10:
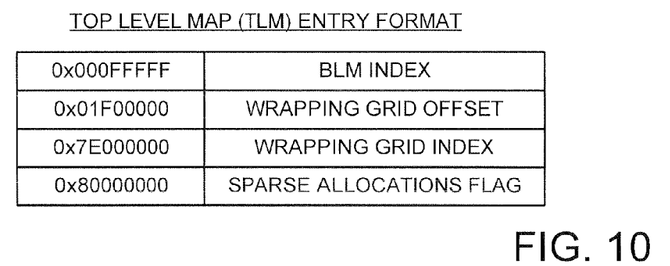
FIG. 10 generally illustrates relevant components of an entry format for a top level map (TLM) used in conjunction with FIG. 9.

A selected entry in the TLM 162 is preferably set forth in FIG. 10, and includes a BLM index value, a Wrapping Grid Offset value, a wrapping grid index, and a sparse allocations flag. In this way, the TLM 162 tracks where each of the smaller grains are located among the variously distributed ISEs 136.

The format for the BLM 164 includes a stripe width shift value, which is selected in relation to a given wrapping grid. As explained below, the virtual spaces for each entry are adjacent when the stripe width shift value is zero, and non-adjacent with the stripe width shift value is non-zero. Preferably, the non-zero stripe width shift values can be 3, 4 or 5 for a given wrapping grid. A change in the available memory size (e.g., adding or removing an ISE 136) may affect the striping. For example, transitioning from 15 to 16 ISEs 136 in a given grid would change the striping to every 16th element rather than every 8th element; half of the data would be redistributed in such case, but this would allow performance rates to be essentially doubled.

At the appropriate boundary (e.g., power of 2) for a given stripe width, a set of TLM entries will reference the same BLM because the virtual block addresses (VBAs) in each of these TLM entries will be contained within that associated BLM. The missing VBA ranges will be striped on other ISEs 136 within that grouping.

Figure 11:
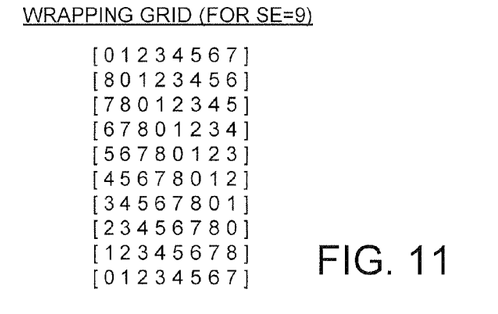
FIG. 11 sets forth an exemplary cyclical wrapping grid function sequence.

FIG. 11 sets forth an exemplary cyclical wrapping grid function for a situation where large grains are to be distributed across nine (9) different ISEs 136 (SET values of 0-8). As can be seen from FIG. 11, the pattern begins with the sequence [0 1 2 3 4 5 6 7], and cycles through nine iterations to arrive back at the initial [0 1 2 3 4 5 6 7] pattern.

In this example, the largest power of 2 less than nine 9 is 8 ($2^3$), so the stripe width is 8 with a shift value of three 3. The shift value is stored in a table and will be associated with the particular 64 byte array of SET values for that wrapping grid. There are 9 Wrapping Grid Offset values that produce unique sets within the array. By using each offset aligning with the SET value of the ISE 136 in turn when mapping the particular data, the data will be uniformly distributed across the 9 ISEs 136.

Figure 12:
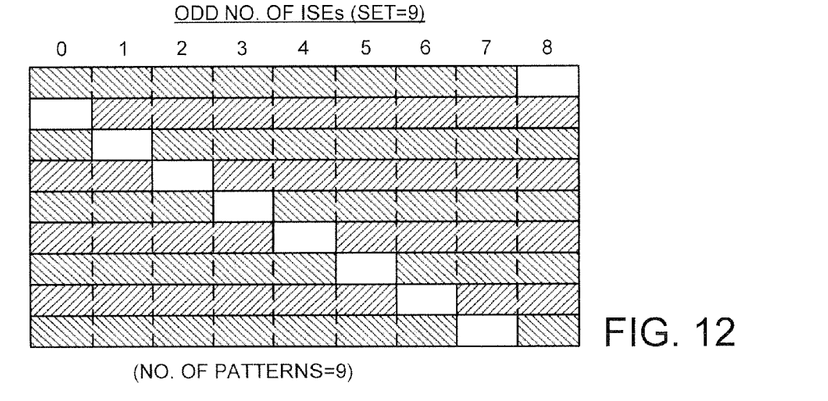
FIG. 12 exemplifies storage of large grains across a set of storage elements in accordance with the wrapping grid function of FIG. 11.

This is generally exemplified in FIG. 12, which shows 9 ISEs 136 (denoted ISE0-ISE8) across which are striped 9 larger grains (denoted as G0-G8) in accordance with the function of FIG. 11. The respectively striped data are shown in cross-hatched fashion in FIG. 12. Note that in this example, the number of smaller grains are nominally balanced among the various ISEs 136, with each ISE storing a total of 8 smaller grains from the 9 larger grains.

The non-used portions of the various ISEs 134 in FIG. 12, denoted by the blank squares within the grid, indicate that the particular ISE 134 does not contribute to that large grain. While FIG. 12 conceptually shows a large grid, preferably each square therein represents 4 GB of space (assuming 16 MB smaller grains) with interleaving at a 16 MB grain. This distributes the grains finely in terms of map boundaries for better spread over the overall 32 GB space. That is, 32 GB is striped at a 16 MB stripe size across the same 8 elements. For the next 32 GB, a different set of 8 elements (out of the 9 elements) is used.

Nevertheless, with respect to the larger grains G0-G8 depicted in FIG. 12, the data of such grains are nominally balanced among the respective storage elements ISE0-ISE8; that is, each of the storage elements 136 stores the same number of smaller grains, which promotes enhanced data I/O rates and reduces bottlenecks for these grains. As noted above, a total of 9 separate patterns are used to establish this balancing.

The TLM entry for a given VBA offset (e.g. a 2 GB or 4 GB boundary) will have a different Member Position on each ISE 136. The Member Position value determines which set of VBA ranges are mapped to a given ISE. In the example of FIG. 12, a TLM entry for storage element ISE0 will have the following combinations of Wrapping Grid Offsets and member positions as follows: {0,0}, {8,1 }, {7,2}, {6,3}, {5,4}, {4,5}, {3,6}, and {2,7}. The SET value of "0" does not occur in the position in the wrapping grid which is equivalent to the ninth pattern. If the values are treated as a sequence of 9*8=72 bytes, all patterns can be obtained by referencing the first 9 positions (offsets 0-8). With a maximum Member Position of 7, the maximum index is 15 (8+7), so only the first 16 bytes need be filled in. FIG. 11 accordingly shows the set of 9 different, unique patterns.

The starting VBA of the second 32 GB will have a value of 0x4000000. If the offset value is 8 and the Member Position is 1 (which identifies a SET value of 0), then the first VBA mapped in this range on the ISE 136 with a SET value of 0 (i.e., ISE0 in FIG. 12) will be offset by 1. This VBA has a VBA offset of 1*16 MB (0x8000) and a value of 0x4008000. The corresponding smaller grain will be mapped by the first entry in the BLM 164. The next entry will have a VBA value that is 8*16 MB (0x40000) higher, which is a value of 0x2048000.

In this way, each ISE 136 can not only tell if it has the data for a given VBA range, but can also tell where the data are when it does not have it. In this example, each one of the ISEs 136 that together map the 32 GB of virtual space has ⅛ of each 4 GB of space (one TLM entry) compacted into one 4 GB BLM.

Preferably, during operation the Member Position will be checked by inspecting the wrapping grid starting at the Wrapping Grid Offset to find the SET value that matches the SET value for the given ISE 136. The SEA 134 will get the SET value to use by shifting the VBA right by 15 (i.e., by dividing by 16 MB) to get the relative offset of the given smaller grain, and then masking by a value of the strip width minus 1 to get the member position. The Member Position is then added to the Wrapping Grid Offset to access the actual wrapping grid table.

The associated ISE 136 likewise calculates the Member Position value for a given VBA it is requested to access and checks the wrapping grid to see if it has the associated data. It is contemplated that 16 MB boundary crossings will be handled by the unit master in all cases. In the aforementioned "basic mode," if a first receiving ISE 136 does not have the requested data, the first receiving ISE 136 will inform the SEA to update its map so as to reference the correct ISE. The SEA will then issue the request to the correct ISE.

The way in which data are distributed across various ISEs 136 depends on a number of factors, such as the number of ISEs 136 in the associated wrapping grid. When the number of ISEs is odd, the number of unique patterns will equal the number of ISEs (e.g., the wrapping grid of FIGS. 11-12 uses both 9 patterns and 9 ISEs 136, etc.).

Figure 13:
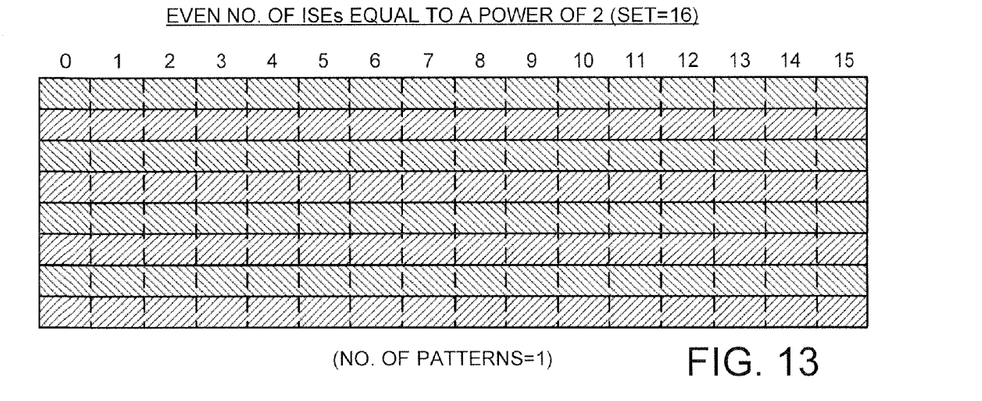
FIG. 13 exemplifies another wrapping grid function.

When the number of ISEs in a wrapping grid is even, the number of patterns required to balance the small grains depends on whether the number of ISEs is a power of 2; if so, only one pattern is used. More particularly, when the total number of ISEs is equal to 1 ($2^0$), 2 ($2^1$), 4 ($2^2$), 8 ($2^3$), or 16 ($2^4$), then a single pattern is used, since each large grain can be equally distributed across all members of the wrapping grid. This is exemplified in FIG. 13, which shows a total number of ISEs 136 equal to 16, each large grain is divided up into 16 smaller grains, and each of the ISEs 136 receives one of the smaller grains from each of the larger grains.

Figure 14:
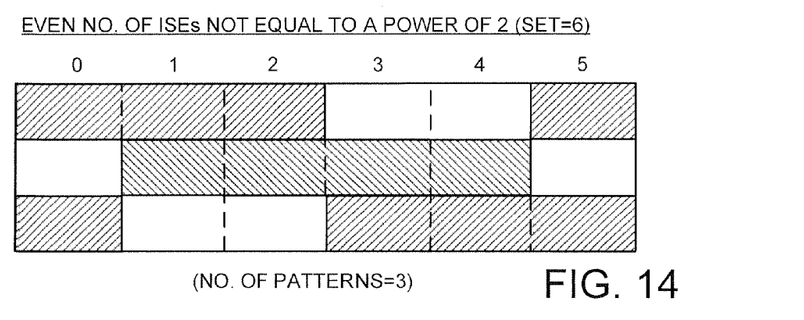
FIG. 14 exemplifies yet another wrapping grid function.

On the other hand, when the number of ISEs is even and not a power of two, then the total number of wrapping grid patterns is determined by dividing the number of ISEs by the largest power of 2 that can be accommodated. This provides the following number of ISEs/number of pattern combinations: {6,3}, {10,5}, {14,7}, {18,9}, {20,5}, {22,11}, {24, 3}, {28,7} and {30,15}. As illustrated in FIG. 14, a total number of 6 ISEs 136 (ISE0-ISE5) use 3 different patterns to receive 4 smaller grains from a larger grain. It will be noted that each of the ISEs 136 in FIG. 11 store the same number of smaller grains (i.e., 2). Similarly, from the foregoing sequence it can be seen that if 30 ISEs 136 are used, then it is necessary to cycle through 15 different patterns to evenly distribute the data. Generally, it may be better to use all patterns to minimize the redistribution cost when adding or removing ISEs 136 from a given set.

The foregoing mapping scheme advantageously allows a host to know (via SET value) where data are on a given small grain boundary, such as 16 MB, using 16 bits per 4 GB. Aside from the wrapping grid definitions and a table to map SET values to ports, the only other values required by the host or the SEA are the Wrapping Grid Offset and Wrapping Grid Index.

Thus, a selected host (or SEA) can efficiently map a large amount of virtual memory using a relatively small amount of overhead data; for example, 2 TB of virtual space can be mapped using only 1 KB ($1\times10^3$ bytes) of memory. It will be appreciated that the host need not manage or store the maps at all; rather, these can be maintained by the ISEs 136 or the ISEs and the SEAs 134. In enhanced mode (normal for a SEA), the SEA will be notified in real time when it issues a particular I/O request to the wrong ISE 136 because the data have been moved. When a SAVE is presented by a SEA, the host will never know.

To provide a concrete illustration of a system configured as set forth above, if the ISE configuration is assumed to have 4 400 MB/s host ports, 40 drives, and 50 TB of virtual capacity, then a virtual controller presenting a SAVE with 96 ISEs 136 can create a single virtual LUN 130 (FIG. 3) that is 4.8 PB ($4.8\times10^{12}$ bytes) in size. Assuming a stripe width of 32, a bandwidth into a single host (with 72 host adapters) can be sustained at a rate of 57.6 GB/s for a given wrapping grid. A SAVE aggregated by 6 SEAs can further support 960K IOPS, and each SEA can map the entire 4.8 PB virtual LUN with a mere 2.4 MB of memory.

While the foregoing map structure provides a preferred methodology for the use of the pooled SEAs 134, it will be appreciated that such is not limiting; that is, the map structures can alternatively, or additionally, stripe selected data to a single ISE 136.

When a selected host write command is forwarded by a selected SEA 134 to an associated subset of ISEs 136 across which the data are to be striped, the associated host data are respectively provisioned to the cache memory 140 (FIG. 5) of the ISEs. If a writeback cache mode is utilized, the selected SEA 134 will return a command complete status to the initiating host to indicate completion of the write command when all ISEs 136 have acknowledged receiving the data for that command, even though the scheduling of the specific writing of data by the individual ISEs 136 takes place later.

The redundant pooling of SEAs 134 as disclosed herein further advantageously enhances data rates through a preferred mode of operation referred to herein as RAID-1 triangulation. Generally, each time at least certain types of host data are written to the virtual LUN, the data are written across a first set of ISEs in relation to the target LUN range. In addition, and in a mode that is transparent to the host, the associated ISEs 136, or the associated SEA 134, directs the data to be written to a second, non-overlapping set of ISEs 136 to provide a second copy of the data.

In this way, the issuance of read I/O requests associated with this selected data can be forwarded to any of the SEAs 134, and can be retrieved from either set of ISEs 136 having a copy of the selected data. This permits the pool of SEA modules to compensate for a degraded ISE by preferring a non-degraded ISE for data that are redundant across ISEs. In this way, device failures would have little or no effect on overall system performance.

Finally, as noted above the system as embodied herein is automatically scalable to meet the then-existing requirements of the virtual storage space. With reference again to FIG. 4, a first set of SEAs 136 (e.g., four) are initially coupled to a selected number of ISEs 136 (e.g., 12) for a first size of virtual storage space allocated thereacross. An additional allocation of resources for the virtual storage space, such as in response to a host allocation to expand the pool of ISEs to 16, preferably results in the further addition of SEAs 136 (such as an additional 2 SEAs) to accommodate the increase in size of the storage space.

The further allocation of SEAs preferably takes place in a manner transparent to the host, and can be initiated by the unit master (160, FIG. 4), by a selected SEA in the initial group, or by one or more of the ISEs. Similar deallocations of SEAs can take place as desired when the virtual storage space is decreased. The decision to add (or remove) SEAs can further be made in relation to then existing load requirements, allowing the throughput capabilities to follow demand levels. In this way, the SEAs operate to aggregate the ISEs responsive to changes in size of the virtual storage space.

It will now be appreciated that, as embodied herein, a virtual storage space 130 is formed across a plurality of storage elements, such as the ISEs 136, each comprising an array of data storage devices, such as the devices 100 in FIG. 5. A virtual controller 132 comprises a first storage element aggregator (SEA), such as the unit master 160 in FIG. 4, configured to issue a first command to a selected storage element in response to receipt by the first SEA of a first host command. The virtual controller further comprises a second SEA 134 (such as a non-unit master SEA in FIG. 4) configured to concurrently issue a second command to the selected storage element in response to receipt by the second SEA of a second host command.

The respective SEAs are accordingly concurrently active, unlike conventional dual controller arrangements where a first device "mirrors" a second device and steps in when the first device fails. The respective SEAs are further concurrently active to overlappingly access the same portions of the LUN and are not merely assigned to different, non-overlapping portions of the storage space.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
    a plurality of storage elements each comprising an array of data storage devices, two or more of the storage elements allocated to the same logical unit number (LUN);
    a virtual controller comprising a top level map (TLM) of the LUN stored in a computer memory and a processor-based storage element aggregator (SEA), the TLM comprising a wrapping grid corresponding to locations of one or more large grains of data in the LUN, the virtual controller, the SEA configured, in response to receipt of a data access command for the LUN, to index the top level map by an address of the data access command to obtain a TLM entry that aggregates a set of two or more of the plurality of storage elements that each contain LUN storage space associated with the data access command; and
    a respective bottom level map (BLM) stored in each of the aggregated storage elements and configured to be indexed by the TLM entry, the BLM comprising small grains of data stored in each of the plurality of storage elements of the LUN, the small grains of data are portions of the one or more large grains of data, the TLM and BLM maps configured to map a first portion of the LUN storage space in the storage element that the respective BLM resides in and a second portion of the LUN storage space residing in a different storage element of the plurality of storage elements.

2. The apparatus of claim 1, wherein the virtual controller comprises a total of at least six concurrently active SEAs each independently operable to concurrently access the storage elements to service respectively received access commands.

3. The apparatus of claim 1, wherein a second SEA is subsequently incorporated into the virtual controller in response to an increase in size of the LUN.

4. The apparatus of claim 1, wherein the virtual controller comprises a second SEA that is configured to index the TLM in response to receipt by the second SEA of a second access command associated with the LUN to aggregate a different set of two or more of the plurality of storage elements that each manage a portion of the LUN associated with the second access command.

5. The apparatus of claim 1, wherein the SEA is configured to generate a command completion status and to forward the command completion status to a host that initiated the first access command.

6. The apparatus of claim 4, wherein the first SEA is a unit master, and wherein the second SEA is configured to obtain permission from the first SEA prior to forwarding the access commands to the aggregated storage elements.

7. The apparatus of claim 4, wherein each of the first and second SEAs comprises a first output port coupled to a first loop switch module (LSM) and a second output port coupled in parallel to a second LSM, and wherein the first and second LSMs are both coupled to the plurality of storage elements.

8. The apparatus of claim 4, wherein each of the first and second SEAs comprises at least one policy processor coupled to a first bus and a plurality of function controllers interconnected via a separate bus.

9. The apparatus of claim 1, wherein each of the plurality of storage elements comprises an intelligent storage element (ISE) comprising at least one processor and a writeback cache memory, and wherein each of the data storage devices comprises a storage drive.

10. A method comprising:
    forming a LUN across a plurality of storage elements each comprising an array of data storage devices;
    in response to an access command for the LUN, indexing by an address of the access command a top level map (TLM) stored in a computer memory to obtain a TLM entry the TLM comprising a wrapping grid corresponding to locations of one or more large grains of data in the LUN;
    using the TLM entry to aggregate a set of two or more of the plurality of storage elements containing respective portions of the LUN storage space associated with the access command; and
    indexing by the TLM entry a respective bottom level map (BLM) in each of the aggregated storage elements to identify a first portion of the LUN allocated to the storage element that the respective BLM resides in and a second portion of the LUN allocated to a different storage element of the plurality of storage elements, the BLM comprising small grains of data stored in each of the plurality of storage elements of the LUN, the small grains of data are portions of the one or more large grains of data.

11. An apparatus comprising:

a plurality of storage elements each including an array of data storage devices, two or more of the storage elements allocated to the same logical unit number (LUN);

a virtual controller having a top level map (TLM) that is configured to be indexed by an address of an access command to identify a bottom level map (BLM) index, the TLM comprising a wrapping grid corresponding to locations of one or more large grains of data in the LUN, the BLM comprising small grains of data stored in each of the plurality of storage elements of the LUN, the small grains of data are portions of the one or more large grains of data evenly distributed among the two or more storage elements allocated to the same LUN, the TLM having a wrapping grid index corresponding to LUN storage locations of the access command in the array.

12. The apparatus of claim 11, wherein the large grains of data each have a storage capacity of less than the LUN.

13. The apparatus of claim 11, wherein the large grains of data are striped across the two or more storage elements according to the wrapping grid.

14. The apparatus of claim 13, wherein small grain of data of each large grain is present in each of the two or more storage elements of the LUN.

\* \* \* \* \*